United States Patent [19]

Kuroda et al.

[11] Patent Number: 4,607,533
[45] Date of Patent: Aug. 26, 1986

[54] ELECTROMAGNETIC FLOWMETER

[75] Inventors: Masato Kuroda; Yoshiro Tanaka; Norikazu Wada, all of Kanagawa, Japan

[73] Assignee: Yamatake-Honeywell, Tokyo, Japan

[21] Appl. No.: 724,371

[22] Filed: Apr. 17, 1985

[51] Int. Cl.[4] .............................................. G01F 1/58
[52] U.S. Cl. ................................................. 73/861.12
[58] Field of Search ........... 73/861.12, 861.13, 861.14, 73/861.15, 861.16, 861.17

[56] References Cited

U.S. PATENT DOCUMENTS 3,580,071 5/1971 Hickman ........................ 73/861.12
4,065,965 1/1978 Ackerman et al. ............. 73/861.12

Primary Examiner—Donald O. Woodiel
Attorney, Agent, or Firm—Mitchell J. Halista; Trevor B. Joike

[57] ABSTRACT

An electromagnetic flowmeter uses a cylindrical inner tube including an electrode, an excitation coil and an inner portion of an electrical connector with the inner portion being located on an outer circumferential surface of the tube and electrically connected to the electrode and the coil, an outer tube housing the inner tube along its axis and having an access opening extending transversely through the outer tube housing and an electrical connector support externally inserted through the access opening for supporting an outer portion of the electrical connector to selectively mate with the first portion of the connector to provide separate electrically conductive paths through the connector for connections to the electrode and the excitation coil.

8 Claims, 2 Drawing Figures

ELECTROMAGNETIC FLOWMETER

BACKGROUND OF THE INVENTION

1. Field of the Invention

The present invention relates to an electromagnetic flowmeter for electrically measuring a flow rate of a fluid flowing through a measurement tube.

2. Description of the Prior Art

An electromagnetic flowmeter measures a flow rate of a conductive fluid flowing through a measurement tube by utilizing a so-called Faraday's electromagnetic induction effect produced by excitation coils. Therefore, the electromagnetic flowmeter can measure the flow rate of any fluid having a conductivity higher than a predetermined electric conductivity. For this reason, with regard to corrosion and wear due to a fluid flowing through the flowmeter, various insulating materials for lining the inner circumferential wall of the measurement tube to protect the coils are available. However, in such an electromagnetic flowmeter, when either a lining material is not suited for a type of fluid to be measured, or when the measurement tube is to be exchanged due to wear of the lining, the flowmeter must be returned to its manufacturer and the affected lining replaced. In a conventional electromagnetic flowmeter such a replacement is time-consuming for an end user and seriously interferes with the availability of the measurement capability. Specifically, the lead wire for the electromagnetic field developing coil in the electromagnetic flowmeter must be carefully handled during the lining replacement since it may be damaged or disconnected. Further, the disassembly and reassembly of the flowmeter requires time consuming and highly skilled operations. Accordingly, in order to avoid such inherent shortcomings of the prior art, it would be desirable to provide an electromagnetic flowmeter having a structure providing a simplified assembly and disassembly capability.

SUMMARY OF THE INVENTION

An object of the present invention is to provide an improved electromagnetic flowmeter having a simplified structure for expediting assembly and disassembly thereof.

In accomplishing this and other objects, there has been provided, in accordance with the present invention, an electromagnetic flowmeter having an electrical connector with a first portion and a second portion separable from the first portion and arranged to mate with the first portion to provide separate electrically conductive paths through the connector means, a cylindrical inner tube including an electrode, an excitation coil and the first portion of the connector means, the first portion being located on an outer circumferential surface of the tube and electrically connected to the electrode and the coil, an outer tube housing the inner tube along its axis, and having an access opening extending transversely through the outer tube housing, and an electrical connector support means externally inserted through the access opening in the outer tube for supporting the second portion of connector means to selectively mate with the first portion of the connector means.

BRIEF DESCRIPTION OF THE DRAWINGS

A better understanding of the present invention may be had when the following description is read in connection with the accompanying drawings, in which.

DESCRIPTION OF THE PREFERRED EMBODIMENT

Figure 1:
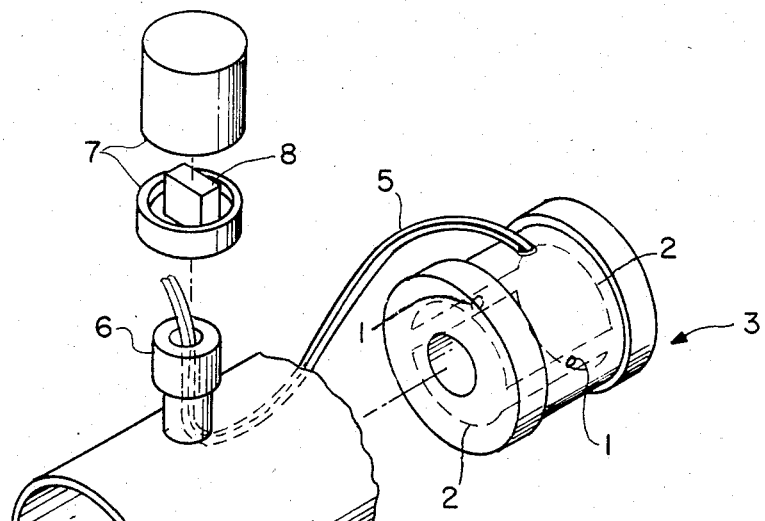
FIG. 1 is an exploded perspective illustration showing a conventional electromagnetic flowmeter.

Referring to FIG. 1 in more detail, there is shown a pictorial illustration of a conventional electromagnetic flowmeter having a cylindrical inner tube 3 which is formed by integrally molding a pair of electrodes 1 and a pair of saddle-like excitation coils 2 and is fitted in an outer tube 4. A lead wire 5 from the electrodes 1 and the coils 2 in the inner tube 3 extends through a fixed access portion 6 provided on the outer circumferential surface of the outer tube 4 into an attached converter case 7 and is connected to an electric circuit unit 8 in the case 7. With this arrangement, the inner tube 3 can be exchanged to provide inner tubes having different lining materials. However, in this electromagnetic flowmeter, since the lead wire 5 extends from the inner side of the outer pipe 4 into the converter case 7 through the fixed access portion 6, it is extremely difficult to insert the lead wire 5 between the inner and outer tubes 3 and 4 in terms of the limited inner tube space without requiring special tools and a skilled technician. Thus, the wire 5 may be damaged or disconnected depending upon a state of the inner and outer tubes 3 and 4, e.g., maching and welding states, or an assembled state of an inner tube 3, and this may ultimately disable the flow measurement. Therefore, this operation requires much time and careful attention, resulting in a degradation in disassembly and assembly time and a high manufacturing cost.

The present invention has been made in consideration of the above situation, and has as its object to provide an electromagnetic flowmeter with a simple structure wherein an electrical connector is provided on the outer circumferential surface of an inner tube, and an internal-/external connector inserted through an outer tube is selectively connected to the connector of the inner tube, thereby allowing easy assembly and replacement.

Figure 2:
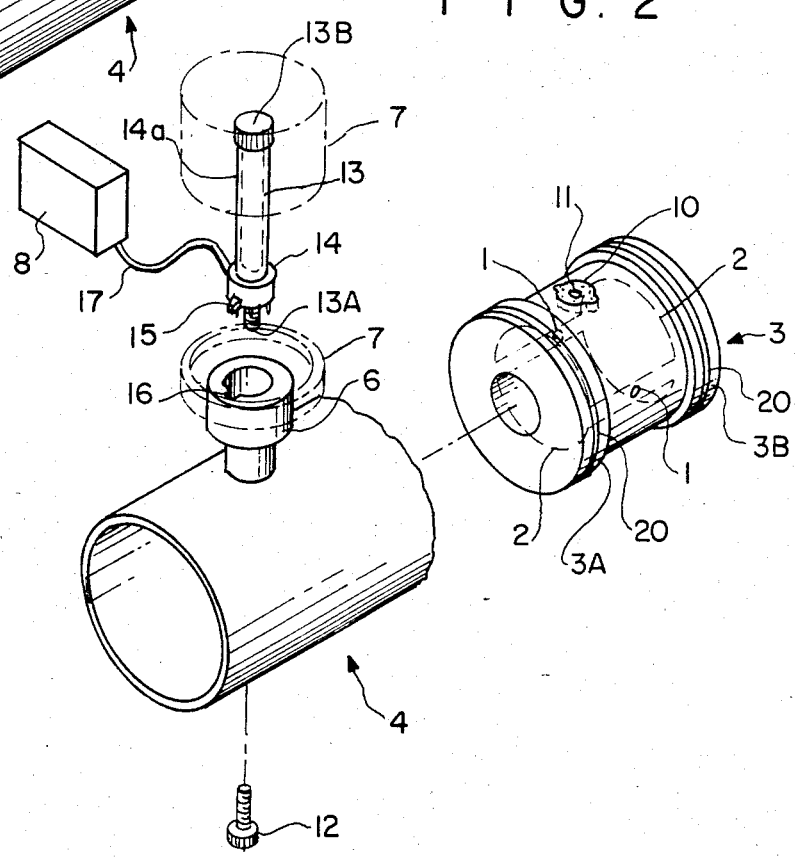
FIG. 2 is an exploded perspective illustration showing an electromagnetic flowmeter according to the present invention.

Referring to FIG. 2 in more detail, there is shown an exploded perspective view of an electromagnetic flowmeter according to an embodiment of the present invention. It should be noted that the same reference numerals as in FIG. 1 denote the same parts in FIG. 2, and a detailed description thereof is omitted. Referring to FIG. 2, a female electrical connector 10 is integrally formed in a portion of the outer circumferential surface of an inner tube 3 corresponding to a fixed access portion 6 provided on an outer tube 4. Terminals of the connector 10 are connected to respective ends of lead wires (not shown) of a pair of electrodes 1 and a pair of saddle-like excitation coils 2 through the interior of the inner tube 3.

A threaded hole 11 is provided at a central portion of the connector 10. Furthermore, two end portions of the inner tube 3 have a large outer diameter so as to be substantially the same as an inner diameter of the outer tube 4. Annular grooves (not shown) are formed in respective outer circumferential surfaces of these large diameter portions 3A and 3B and O-rings 20 are fitted therein, respectively. The inner tube 3 is fitted in the outer tube 4 along its axial direction and thereafter is aligned and fixed by a stop screw 12 which is inserted through the outer tube 4. Note that in this embodiment, the electrodes 1 and the saddle-like excitation coils 2 are integrally molded to form the inner tube 3. However, the present invention is not limited to this, e.g., the electrodes 1 and coils 2 can be separate elements from the inner tube 3.

An internal/external male connector 14 which is rotatably fitted around a screw rod 13 to be movable along its axial direction is inserted in the case fixing portion 6 of the outer tube 4 together with the screw rod 13, thereby coupling the male and female connectors 14 and 10. A projection 15 is integrally formed on the outer circumferential surface of the male connector 14. When the projection 15 is slidably fitted in a fitting groove 16 formed in the inner circumferential surface of the case fixing portion 6 along its axial direction and is slid downward, rotation of the connector 14 can be prevented, and this allows quick and firm connection between the connectors 10 and 14.

Additionally, a threaded portion 13A formed at a distal end portion of the screw rod 13 is screwed into the threaded hole 11, and the inner tube 3 is sufficiently aligned and fixed at an inner predetermined position of the outer tube 4 by means of the screw rod 13 and the stop screw 12. When the screw rod 13 is threaded in, a lower surface of its thumb nut 13B presses an upper end face of a cylinder portion 14a formed integrally with the male connector 14, and the male connector 14 can be satisfactorily coupled to the female connector 10. Note that the male connector 14 is prevented from being disconnected from the screw rod 13 by the threaded portion 13A and the thumb nut 13B. Reference numeral 17 denotes a lead wire for continuously connecting the male connector 14 and the electric circuit unit 8. In addition, the outer tube 4 is connected to a main flow tube (not shown) through which a fluid to be measured flows through the inner tube 3.

As described above, in the electromagnetic flowmeter according to the present invention, an electrical connector is provided on the outer circumferential surface of an inner tube provided with electrodes, a coil and the like. The inner tube is fitted in an outer tube along its axial direction, and an internal/external connector is inserted through the outer tube so as to be coupled to the connector of the inner tube. With this arrangement, an operation for connecting a lead wire to the converter device 8 through the outer tube 4 is not needed, thus greatly improving operability of assembly and replacement of the inner tube 3. Since no lead wire is exposed, damage or disconnection thereof can be prevented, thus providing a flowmeter which allows easy handling and maintenance.

Accordingly, it may be seen that there has been provided, in accordance with the present invention, an improved electromagnetic flowmeter for expediting assembly and disassembly thereof.

The embodiments of the present invention in which an exclusive property or privilege is claimed are defined as follows:

1. An electromagnetic flowmeter comprising
   electrical connector means having a first portion and a second portion separable from said first portion and arranged to mate with said first portion to provide separate electrically conductive paths through said connector means,
   a cylindrical inner tube including an electrode, an excitation coil and said first portion of said connector means, said first portion being located on an outer circumferential surface of said tube and electrically connected to said electrode and said coil,
   an outer tube housing said inner tube along its axis, and having an access opening extending transversely through said outer tube housing, and
   an electrical connector support means externally inserted through said access opening in said outer tube for supporting said second portion of connector means to selectively mate with said first portion of said connector means.

2. A flowmeter as set forth in claim 1 wherein said electrical connector support means has a threaded end arranged to mate with said first portion of said connector means.

3. A flowmeter as set forth in claim 1 wherein said electrical connector support means includes a sleeve and a rod extending axially through said sleeve and having a threaded end on said rod to mate with said first portion of said connector means.

4. A flowmeter as set forth in claim 3 wherein said electrical connector support means includes index means for preventing rotation of said sleeve when said rod is threaded into said first portion of said connector means.

5. A flowmeter as set forth in claim 4 wherein said outer tube includes fixing means for establishing a fixed location of said inner tube within said outer tube.

6. A flowmeter as set forth in claim 3 wherein said electrical connector means includes electrical lead wire means connected to said second portion of said connector means through said sleeve.

7. A flowmeter as set forth in claim 3 wherein said support means includes a knob attached to said rod at the other end of said rod from said threaded end and adjacent to said sleeve.

8. A flowmeter as set forth in claim 1 wherein said first portion includes a plurality of pin receiving sockets and said second portion includes a plurality of pins arranged to mate with said sockets.

* * * * *